US010193388B2

(12) United States Patent
Anttila et al.

(10) Patent No.: US 10,193,388 B2
(45) Date of Patent: Jan. 29, 2019

(54) INDUCTIVE CHARGING

(71) Applicant: POWERMAT TECHNOLOGIES, LTD., Neve Ilan (IL)

(72) Inventors: Sami Anttila, Espoo (FI); Ville Byman, Espoo (FI)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 134 days.

(21) Appl. No.: 15/190,807

(22) Filed: Jun. 23, 2016

(65) Prior Publication Data

US 2016/0308392 A1    Oct. 20, 2016

Related U.S. Application Data

(63) Continuation of application No. 13/701,730, filed as application No. PCT/FI2010/050459 on Jun. 3, 2010, now Pat. No. 9,412,512.

(51) Int. Cl.
| | | |
|---|---|---|
| H02J 50/10 | (2016.01) | |
| H02J 5/00 | (2016.01) | |
| H02J 7/02 | (2016.01) | |
| H02J 7/04 | (2006.01) | |
| H01F 38/14 | (2006.01) | |
| H02J 50/80 | (2016.01) | |

(52) U.S. Cl.
CPC .............. *H02J 50/10* (2016.02); *H01F 38/14* (2013.01); *H02J 5/005* (2013.01); *H02J 7/025* (2013.01); *H02J 7/042* (2013.01); *H02J 50/80* (2016.02)

(58) Field of Classification Search
USPC ........................................................ 307/104
See application file for complete search history.

(56) References Cited

U.S. PATENT DOCUMENTS

| | | | |
|---|---|---|---|
| 2009/0096413 A1 | 4/2009 | Partovi et al. | |
| 2009/0322280 A1 | 12/2009 | Kamijo | H02J 9/005 320/108 |
| 2010/0007307 A1 | 1/2010 | Baarman et al. | |
| 2010/0164458 A1 | 7/2010 | Pollard | F42C 11/04 323/284 |
| 2010/0264746 A1* | 10/2010 | Kazama | H02J 7/025 307/104 |
| 2010/0277003 A1 | 11/2010 | Von Novak | H01F 38/14 307/104 |

FOREIGN PATENT DOCUMENTS

WO    WO 2007/013726 A1    2/2007

OTHER PUBLICATIONS

International Search Report issued in International Application No. PCT/FI2010/050459 dated Mar. 1, 2011.
Written Opinion of the International Searching Authority issued in International Application No. PCT/FI2010/050459 dated Mar. 1, 2011.

* cited by examiner

*Primary Examiner* — Danny Nguyen
(74) *Attorney, Agent, or Firm* — William Dippert; Laurence Greenberg; Werner Stemer

(57) ABSTRACT

There is provided a method comprising transmitting inductively a first signal, receiving inductively a second signal in response to the first signal, determining whether the inductively received signal comprises a modulation, and adjusting a power of the transmitted signal on the basis of a modulation of the received signal.

11 Claims, 2 Drawing Sheets

INDUCTIVE CHARGING

CROSS-REFERENCE TO RELATED APPLICATIONS

This application is a continuation of U.S. patent application Ser. No. 13/701,730, filed Dec. 3, 2012, which in turn is a U.S. National Phase Application under 35 U.S.C. § 371 of International Patent Application No. PCT/FI2010/050459, which has an international filing date of Jun. 3, 2010, the contents and disclosure of which are incorporated herein by reference in their entirety.

FIELD OF THE INVENTION

The exemplary and non-limiting embodiments of this invention relate generally to transfer of energy wirelessly and more particularly to transfer of energy wirelessly by induction.

BACKGROUND OF THE INVENTION

Induction can be used to transfer power wirelessly from a power supply to a mobile phone to be charged. For this purpose the mobile phone can connect to an adapter that can receive the induced power so as to provide a charging current to be fed to the mobile phone. The mobile phone receives the current and feeds it to the connected battery for charging it.

During the charging the adapter can use the inductively received power to inductively send data to the power supply. This data may include information about a status of the charging for example.

However, the impedance of the mobile phone as perceived by the adapter may change during the charging. This may happen due to the mobile phone being used for calling during the charging, for example. Since the adapter and the mobile phone are electrically coupled during charging, thereby forming a single circuit, the impedance changes in the mobile phone are reflected as distortions to the data that is sent to the inductive power supply. The impedance changes may be unpredictable and thereby difficult to compensate for.

Since the mobile phone and the adapter form a single circuit during charging, also noise from the mobile phone can couple with the adapter circuitry and distort the data being induced to the power supply. Furthermore, variations in the distance between the power supply and the adapter may cause distortions in the inductively received data in the power supply, also when charging is not performed.

Accordingly, the data induced to the power supply from the adapter can be distorted in many ways and the status information form the charging can not be obtained in the power supply. Therefore, it may be increasingly difficult for the power supply to determine if the battery is charged and/or to stop charging, or if the adapter is within the range to receive power from the power supply. Consequently, erroneously received data from the adapter may cause the power supply to stop the charging even if the adapter is within the range to receive power or to falsely determine that the adapter is not within the range to receive power.

BRIEF DESCRIPTION OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various embodiments comprise methods, apparatuses, a computer program, a computer program product, a computer readable medium, an article of manufacture, and a system as defined in the independent claims. Further embodiments are disclosed in the dependent claims.

According to an aspect, there is provided a method comprising transmitting inductively a first signal, receiving inductively a second signal in response to the first signal, determining whether the inductively received signal comprises a modulation, and adjusting a power of the transmitted signal on the basis of a modulation of the received signal.

According to an aspect, there is provided a method comprising receiving inductively a signal, determining whether the inductively received signal comprises a modulation, and determining on the basis of the inductively received signal comprising a modulation that a device exists within a range of an inductive transfer.

According to another aspect, there is provided a method comprising receiving inductively a signal, determining whether the inductively received signal comprises a modulation, and transferring power inductively, on the basis of the received signal comprises a modulation.

According to another aspect, there is provided an apparatus comprising a transmitter configured to transmit inductively a first signal, a receiver configured to receive inductively a second signal in response to the first signal, a controller configured to determine whether the inductively received signal comprises a modulation, and a controller configured to adjust a power of the transmitted signal on the basis of a modulation of the received signal.

According to another aspect, there is provided an apparatus comprising a receiver configured to inductively receive a signal, a controller configured to determine whether the inductively received signal comprises a modulation, and a controller configured to determine on the basis of the inductively received signal comprising a modulation that a device exists within a range of an inductive transfer.

According to another aspect, there is provided an apparatus comprising a receiver configured to inductively receive a signal, a controller configured to determine whether the inductively received signal comprises a modulation, and a transmitter configured to transfer power inductively, on the basis of the received signal comprises a modulation.

According to another aspect, there is provided an apparatus comprising transmitting means configured to transmit inductively a first signal, receiving means configured to receive inductively a second signal in response to the first signal, determining means configured to determine whether the inductively received signal comprises a modulation, and adjusting means configured to adjust a power of the transmitted signal on the basis of a modulation of the received signal.

According to another aspect, there is provided an apparatus comprising receiving means configured to receive inductively a signal, determining means configured to determine whether the inductively received signal comprises a modulation, and determining means configured to determine on the basis of the inductively received signal comprising a modulation that a device exists within a range of an inductive transfer.

According to another aspect, there is provided an apparatus comprising receiving means configured to receive inductively a signal, determining means configured to determine whether the inductively received signal comprises a modulation and transmitting means configured to transfer power inductively, on the basis of the received signal comprises a modulation.

According to another aspect, there is provided a system comprising an apparatus according to an aspect.

According to another aspect, there is provided a computer program comprising program code means adapted to perform a method according to an aspect.

According to another aspect, there is provided a computer readable medium comprising computer readable code for executing a computer process According to another aspect, there is provided a computer program product, comprising a computer usable medium having a computer readable program code embodied therein, said computer readable program code adapted to be executed to implement a method according to an aspect.

According to another aspect, there is provided an article of manufacture comprising a computer readable medium and embodying program instructions thereon executable by a computer operably coupled to a memory which, when executed by the computer, carry out a method according to an aspect.

According to another aspect, there is provided an article of manufacture comprising media comprising programming configured to cause processing circuitry to perform processing according to an aspect.

Some aspects may provide an improvement that enables an inductive power supply to determine that inductively transferred power is being received over the inductive link even if inductively received data received in response to the transfer of power is erroneous. Some aspects may provide an improvement comprising that the power supply may continue charging even if data is not successfully received from over the inductive link during the charging. Some aspects may provide an improvement that one or more devices within a range of inductive transmissions from an inductive power supply may be detected even if inductively received data from the devices is corrupted. Some aspects may provide an improvement that a power of inductively transmitted signals may be adjusted.

Although various aspects, embodiments and features are recited independently, it should be appreciated that all combinations of the various aspects, embodiments, and features are possible and within the scope of the present invention as claimed.

BRIEF DESCRIPTION OF THE DRAWINGS

In the following the invention will be described in greater detail by means of exemplary embodiments with reference to the accompanying drawings, in which.

DETAILED DESCRIPTION OF THE INVENTION

Figure 1:
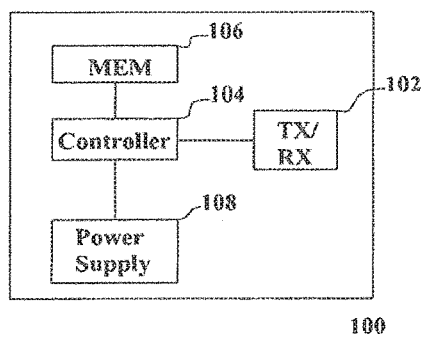
FIG. 1 illustrates an apparatus according to an exemplary embodiment.

Exemplary embodiments will now be described more fully hereinafter with reference to the accompanying drawings, in which some, but not all embodiments are shown. All words and expressions should be interpreted broadly and they are intended to illustrate, not to restrict, the embodiment.

Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any apparatus, device, adapter, module, or corresponding component that may receive and transmit signals inductively.

In the following exemplary embodiments a device to be charged or a charged device may be used to refer to a device that may be capable of being induced a current when the device is located within a varying magnetic field. It may be sufficient that only a part of the device, e.g., a receiver, may be capable of being induced a current. Accordingly, the receiver may be an adapter connected to the device to be charged and thereby forming a single device. Accordingly, the device to be charged may be, e.g., a mobile phone, battery, an adapter or a circuit, or a combination of two or more of the previous. In the following exemplary embodiments the device to be charged may also be capable of generating a varying magnetic field and thereby inductively transmitting a signal.

In the following exemplary embodiments, when a device is inductively charged, power may be transferred to the device. Thereby energy stored in the charged device may be increased. The energy may be stored, for example, to a battery within or operatively connected to the charged device.

The block diagram in FIG. 1 shows a reference hardware configuration of an apparatus 100 according to an exemplary embodiment. The apparatus may be an inductive power supply. Thus, the apparatus may transfer power by electromagnetic induction to a device. Consequently, the device may be charged. The connections between the units of apparatus 100 may be electrical connections, however without limiting thereto. The block diagram in FIG. 1 illustrates only one example of implementing the apparatus and also other arrangements of connections and blocks of the apparatus may be used. It should be appreciated that the apparatus and parts of the apparatus of FIG. 1 may be implemented in one or more logical of physical entities. Thereby, FIG. 1 illustrates only an exemplary configuration.

The apparatus 100 in FIG. 1 may comprise a transceiver unit 102 for inductive transmission and reception. The transceiver unit may comprise separately a transmitter for inductive transmission and a receiver for inductive reception. Accordingly, the transceiver may provide transmission and reception of electrical signals by way of electromagnetic induction. In some embodiments the transceiver unit may only be capable of inductive reception and the transceiver employs another technique than electromagnetic induction for transmitting. In some embodiments the transceiver unit may only be capable of inductive transmitting and the transceiver employs another technique than electromagnetic induction for reception.

The inductive transmissions may be provided by the transceiver 102 in FIG. 1 by generating a varying magnetic field. Thereby the transceiver may induce a current to a device to be charged when the device to be charged is within the generated magnetic field. When the device to be charged is within the generated magnetic field, the device is within a range of inductive transfer of one or more signals from the inductive power supply. The inductive reception may be provided by the material of the transceiver comprising a conductive material. Accordingly, the transceiver may be configured to inductively transfer power by the generated varying magnetic field inducing a power in the charged device and to inductively receive an electrical signal by a current induced to the transceiver. In an embodiment the transceiver unit comprises a coil that provides the inductive transmission and reception of signals.

In an embodiment the transceiver unit may comprise one or more frequencies of operation. Accordingly, when a signal to be inductively transmitted is within the frequencies of operation the power of the transmitted signal is higher than if the same signal would be shifted in frequency to be at least partly outside the operational frequencies of the transceiver unit. The operational frequencies may include a resonance frequency with a charged device or a device to be charged.

The apparatus 100 may further comprise a power supply 108 configured to generate a signal to be fed to the transceiver so as to generate a varying magnetic field and cause a current corresponding to the signal to induce to one or more nearby devices. The signal may be any kind of signal that provides communications between the inductive power supply and devices within a range of inductive transmission from the inductive power supply. For example, the power supply may generate a sine wave, or a rectangular wave. For example, the signal may be a charging signal that is used to transfer power inductively to a device to be charged. Accordingly, when a charging signal is generated, the signal level, thus voltage, may be set so that the charging is efficient, thus on the basis of the charged device, for example. The voltage may be set, for example, according to the charged device. The signal may also be a poll signal that may be used to request a device to send identification information to the inductive power supply, or a status query signal requesting a charged device to send status information of the charging, e.g., information whether charging is performed or finished.

In an embodiment the charging signal may comprise an alternating current, e.g., a sine wave. The amplitude of the sine wave may be determined on the basis of the needed voltage of charging at the charged device, for example.

The apparatus further comprises a controller 104 that controls inductively transmitting signals generated by the power supply 108. Accordingly, the controller may control the inductive power supply to start or stop charging and/or. The controller connects to the power supply so as to receive a signal generated by the power supply 108. The controller 104 also connects to the transceiver to feed the generated signal to the transceiver so as to inductively transmit the generated, and to receive signals induced to the transceiver. The controller may further comprise a decoder so as to decode the received signals from the transceiver.

The controller 104 is a central element that essentially comprises an arithmetic logic unit, a number of special registers and control circuits. A Memory unit 106, a data medium where computer-readable data or programs or user data can be stored, is connected to the processing unit 102. The memory unit 106 may typically comprise memory units that allow for both reading and writing (RAM) and memory whose contents can only be read (ROM).

The controller 104, the memory unit 106, the power supply 108 and the transceiver unit 102 may be electrically interconnected to provide means for performing a systematic execution of operations on the received and/or stored data according to the predefined, essentially programmed processes of the apparatus. In solutions according to an exemplary embodiment, the operations comprise functions for determining whether the inductively received signal comprises a modulation, and adjusting a power of the transmitted signal on the basis of a modulation of the received signal. In solutions according to another exemplary embodiment, the operations comprise functions for determining whether the inductively received signal comprises a modulation, and transferring power inductively, on the basis of the received signal comprises a modulation. These operations are described in more detail with FIGS. 2 to 3.

It should be noted that only elements necessary for describing an exemplary embodiment are illustrated in FIG. 1. To a person skilled in the art it is clear that an apparatus transferring power inductively and receiving induced data may comprise a plurality of further elements and functionalities not explicitly illustrated herein. In addition, the blocks illustrate logical or functional units that may be implemented in or with one or more physical units, notwithstanding whether they are illustrated as one or more blocks in FIG. 1.

Figure 2:
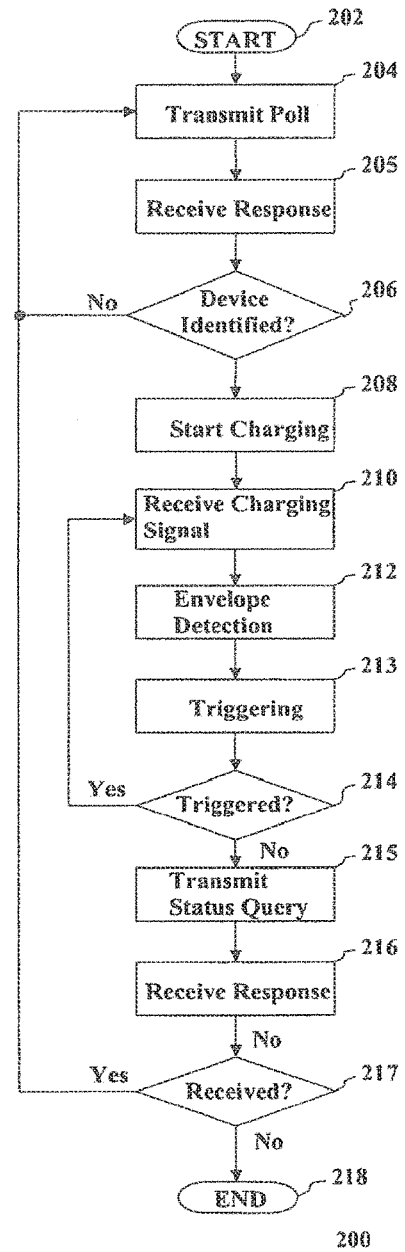
FIG. 2 illustrates a process according to an exemplary embodiment.

FIG. 2 illustrates a process of transferring power inductively from an inductive power supply to another device, according to an exemplary embodiment. The process may be implemented in the apparatus of FIG. 1, for example. The process begins in 202, where the power supply is turned on and is ready to charge devices, e.g., a mobile phone that is brought within a range to receive power inductively.

In steps 204 to 206 the inductive power supply determines that a device to be charged is within a range of inductive transfer of signals from the inductive power supply.

In 204 the inductive power supply transmits inductively a poll signal. Accordingly, the inductive power supply may generate a varying magnetic field corresponding to a poll signal and thereby induce the poll signal to a device within the magnetic field. The poll signal may be transmitted between predetermined time periods, for example, so as to check whether any device has become within the range of the inductive power supply. When a device enters the generated magnetic field, a current corresponding to the poll signal is induced to the device. In 205 the inductive power supply receives inductively a response. Accordingly, the response may have been transmitted inductively by the device within the range of inductive transfers from the inductive power supply. When the device within the magnetic field is induced the inductively transmitted poll signal from the inductive power supply, the device may use the induced signal to generate a response that may be induced to the transceiver of the power supply.

In an embodiment in 204 the inductive power supply transmits a poll signal that is inductively received in the device to be charged. The device to be charged modulates the received poll signal with a data signal. The data signal may include a content that identifies the device to the inductive power supply. In 205 the inductive power supply may receive a response to the inductively transmitted poll signal. Accordingly, the device to be charged may transmit in response to the inductively transmitted poll signal, a modulated poll signal carrying an identification of the device to be charged.

In 206, it is determined whether the device to be charged is identified. The identification received in the response in 205 is evaluated in the inductive power supply. If the identification of the device to be charged is not accepted the process proceeds to 204 so as to continue detecting nearby devices. If the identification of the device to be charged is accepted, the process proceeds to 208.

In 208, the inductive power supply starts to charge the identified device. The charging may comprise generating a charging signal in the power supply of the inductive power supply and inductively transmitting the generated signal by feeding the charging signal to the transceiver in the inductive power supply so as to generate a varying magnetic field. In this way power may be inductively transferred to one or more devices within the magnetic field. Accordingly, the device may be inductively charged by the inductive power supply. In an embodiment, where the transceiver comprises a coil the charging signal may be fed to the coil to generate the varying magnetic field.

In an embodiment, in 208 a power of the charging signal may be determined. The power of the charging signal may be determined on the basis of the identified device to be charged. Accordingly, the identification information received in 205 may be used to determine the power of the charging signal needed for charging the identified device. In this way the power level of the charging signal may be adjusted according to the identified device and consumption of unnecessary power in generating the charging signal may be avoided. In an embodiment in 208 a charging signal has a power that is greater than the power used to inductively transmit data signals. Accordingly, the power of the charging signal may be higher than that of a poll signal, or a status query signal. In this way the power consumption of the inductive power supply may be high only when a device is charged and the overall power consumption of the inductive power supply may be kept low.

In an embodiment the power of the charging signal is higher than the power of the poll signal. Accordingly, a power of the charging signal may be determined on the basis of the identification received in 205.

In 210 a signal may received in a transceiver of the inductive power supply. The received signal may comprise a charging signal that has been modulated with a data signal in the charged device. Accordingly, the received charging signal comprises a modulation. Since the received charging signal has been modulated, its basic characteristics have been changed according the basic characteristics of the modulating data signal. These basic characteristics may include amplitude, for example.

In an embodiment, the received signal in 210 is a response to the inductively transmitted charging signal. The response may be received during the inductive power supply transmitting a charging signal. The response may comprise a modulated charging signal.

In an embodiment the charging signal received in the inductive power supply comprises a load modulation performed in the charged device. The load modulation may comprise modulating the charging signal by switching a load to the received charging signal. Accordingly, when the charged device inductively transmits the so processed charging signal back to the inductive power supply, the load modulation performed in the charged device is reflected to the inductive power supply, thereby causing a change to the original charging signal generated by the inductive power supply.

In steps 212 to 214 is determined whether the received charging signal comprises a modulation. This may comprise determining whether the basic characteristics of the charging signal have been changed according the basic characteristics of the modulating data signal. Where the modulation performed in the charged device comprises switching a load to the received charging signal, the characteristics of the load are reflected to the charging signal. Therefore, the changed characteristics depend on the load and the frequency of switching. The load may comprise a resistor, a capacitor, a coil, or any combination of the previous.

In an embodiment, where the modulation comprises changing an amplitude of the modulated signal, e.g., a charging signal, a modulation may be determined on the basis of one or more amplitude changes in the received signal. A threshold may be set for determining an amplitude change.

In 212 a waveform of the data used to modulate the charging signal is derived using envelope detection. The envelope detection may comprise half-rectification, low-pass filtering and biasing of the received charging signal.

In 213 a modulating waveform used to modulate the charging signal in the charged device may be determined. The modulating waveform may comprise a waveform of a data signal that is used to modulate the charging signal. The determining of the waveform may comprise determining amplitude changes in the envelope detected charging signal obtained in step 212. Accordingly, the amplitude changes may be used in determining the waveform of the data signal used to modulate the charging signal in the charged device. When an amplitude change exceeds a threshold, this triggers a modulation value to be determined. The modulation values may be, e.g., 1 or 0. Accordingly, the amplitude changes in the envelope detected charging signal are triggered to obtain data from the charging signal and thus may be referred to as triggering edges.

In an embodiment in 213 an amplitude change is determined when the amplitude change of the envelope detected signal exceeds a threshold. The threshold may be defined proportional to the minimum and maximum amplitude in the envelope detected signal. For example, the maximum amplitude may be +5 V and the minimum amplitude may be −5 V. Then the threshold may be a change of 40% from the minimum and maximum values. Consequently, with a threshold of 40%, the amplitude change may determined when the amplitude of the signal decreases below +3 V from, e.g., the highest value +5, or when the amplitude of the signal increases above −3 V from the lowest value of 5V.

In another example, the threshold for determining an amplitude change may be set as units of amplitude from the peak amplitude. Thus, e.g., a unit change of 1 V from a peak may result in determining of an amplitude change. Accordingly, if the voltage in the received signal changes from 5V to 4V or from −5V to −4V, an amplitude change may be determined in the envelope detected signal.

In 214 it is determined, whether one or more amplitude changes were determined in the envelope detected charging signal in 213.

If at least one amplitude change has been determined, it may be determined in 214 that the inductively received charging signal in 208 comprises a modulation and the charging started in 208 may be continued. Then the process proceeds to 210 so as to receive induced transmissions from the charged device during the transmitting of the charging signal. In an embodiment, since a modulation has been determined in the inductively received charging signal, it may be determined in 214 that the charged device is within a range of inductive transfer of signals from the inductive power supply.

If no amplitude changes are determined, it may be determined in 214 that the inductively received charging signal in 208 does not comprise a modulation and the process proceeds to 215. Thereby, the inductively received signal does not comprise any data signal. Therefore, the charging started in 208 may be stopped. Accordingly, since no amplitude changes have been determined, the amplitude changes in the inductively received signal from the charged device have been below any threshold or the inductively received signal does not comprise amplitude changes. Therefore, it may be determined in 214 that the inductively received signal in 210 does not comprise a modulation. Since there is not modulation the inductively received signal does not comprise data to the inductive power supply. In an embodiment, since a modulation has not been determined in the inductively received charging signal, it may be determined in 214 that the charged device is not within a range of inductive transfer of signals from the inductive power supply.

In an embodiment, a predetermined period may be defined during which a modulation has to be determined in steps 212 to 214 in the inductively received signal in 210 so as to continue charging. If a modulation of the charging signal is not determined at least once during the predetermined period, the charging process may be discontinued, since it may be determined that the charged device has left the range of inductive transfer of the charging signal. Accordingly, the predetermined period may be a time period defined for communications to be received from the charged device during the charging. For example, the predetermined time period may define a time period in which the charged device modulates the received charging signal at lest once. In another embodiment, the charging is discontinued if a modulation is not determined in the inductive power supply in every second time period.

As the decision in 214 to continue charging is made on the basis of the determined modulation in the received signal, it is not necessary to decode and understand the received signal in the inductive power supply. Thereby, errors in detecting and decoding the message do not affect the decision of continuing the charging and the distortions in the inductively received signals are less likely to cause interruption of charging. Accordingly, in the exemplary embodiments charging may be continued even if bit errors in the decoded data are high.

In 215 a status query signal may be inductively transmitted. The As a response to the status query signal a modulated status query signal carrying a charging report may be inductively received in 216 in the inductive power supply. Accordingly, the charging report may have been used to modulate status query signal.

In an embodiment in 215 a status query signal may be generated that has a power that is less than the power used in charging. Accordingly, the power of the status query signal may be less than that of a charging signal. In this way the power consumption of the inductive power supply may be high only when a device is charged and the overall power consumption of the inductive power supply may be kept low.

In an embodiment, a power of the transmitted signal from the inductive power supply may be adjusted on the basis of a modulation of the inductively received signal determined in 214. Accordingly, when a modulation is not determined in 214 during charging, the charging may be stopped. Accordingly, since no modulating was determined, it is not necessary charge and to transmit inductively a high power signal, but in 215 a status query signal with a lower power than the charging signal may be transmitted. The adjusting of the power may comprise adjusting a frequency, an amplitude, or a pulse width of the transmitted charging signal.

In 217 the inductive power supply determines whether a charging report has been received from the charged device.

If in 217 it is determined that a charging report has been received, the charged device is still within the inductive transfer range of the inductive power supply and able to receive a charging signal from the inductive power supply. Then the process proceeds to 204, where a modulated poll signal is awaited from the charged device to start charging.

If in 217 it is determined that a charging report is not received, it is determined that the charged device has been removed the inductive transfer range of the inductive power supply and currents can not be induced to the charged device by the inductive power supply. Accordingly, the device can not be charged anymore and the process ends in 218.

The process of FIG. 2 may be repeated for each device that enters the range of inductive transfer of signals from the inductive power supply.

It should be appreciated that the determining on the basis of the inductively received signal comprising a modulation described in the process of FIG. 2, may be used for any inductively received signals, including a modulated polling signal, a modulated charging signal and a modulated status query signal. Accordingly, the steps 210 to 214 in FIG. 2 may be applied to other inductively received signals. This will be described below with FIG. 3.

Figure 3:
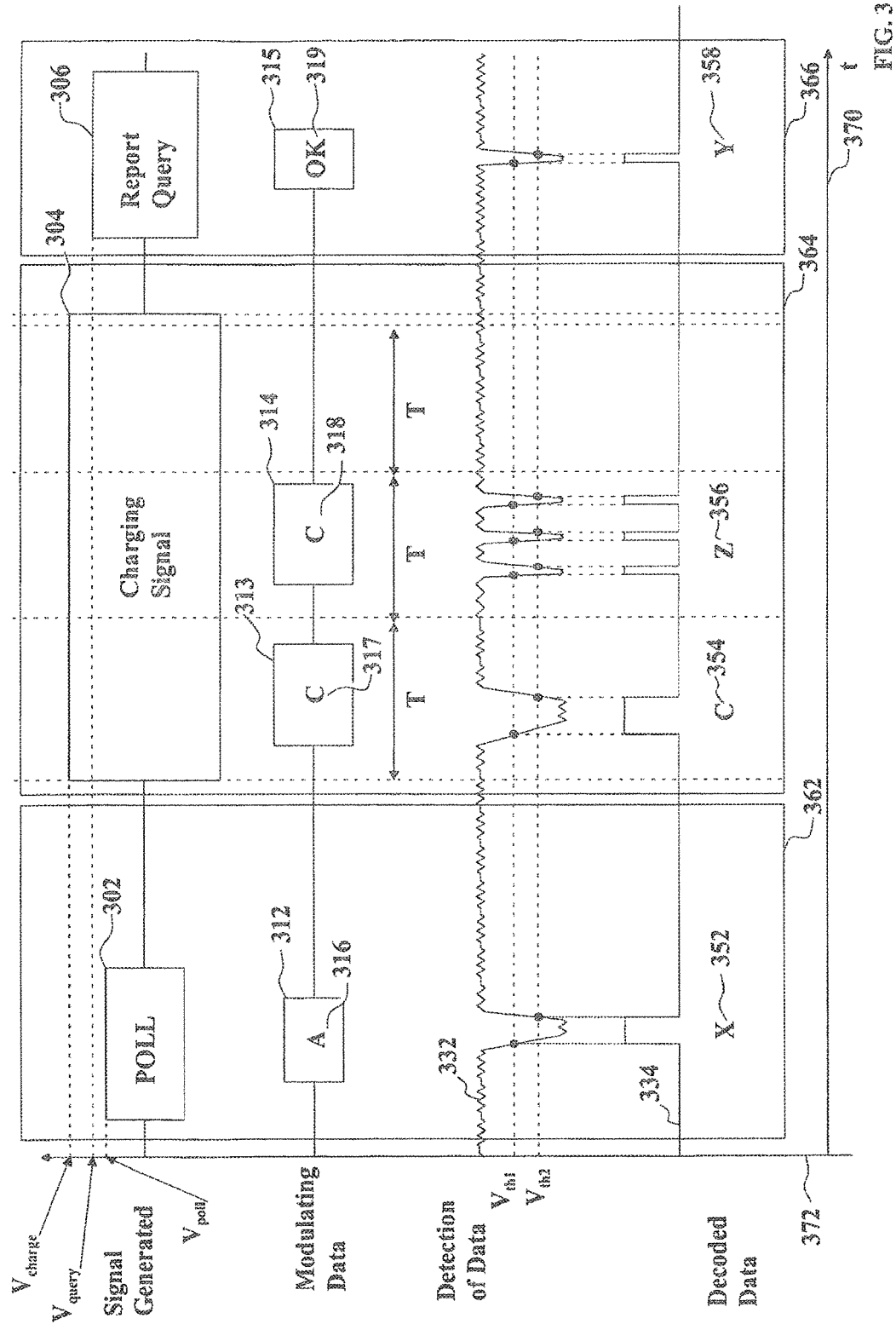
FIG. 3 illustrates generated signals, waveforms of received signals and result of decoding according to an exemplary embodiment.

FIG. 3 illustrates generated signals, waveforms of received signals and result of decoding, according to an exemplary embodiment. The exemplary scenario of FIG. 3 may represent signals and waveforms in the process of FIG. 2. The apparatus illustrated in FIG. 1 shows an example of an apparatus that may be used in the scenario of FIG. 3. It should be noted that the amplitudes and durations of signals are merely exemplary and not necessarily in scale.

With reference now to FIG. 3, the illustrated items have been plotted as a function of time. A time axis is illustrated in item 370 to understand the order of events in FIG. 3. Exemplary voltage levels are illustrated by dashed lines crossing the amplitude axis 372. The voltage levels may be maximum voltages. Items 302 to 306 illustrate signals fed to a transceiver of an inductive power supply so as to be inductively transmitted. Accordingly, item 302 illustrates an example of a poll signal, item 304 illustrates an example of a charging signal and item 305 illustrates an example of a status query signal.

Each of the items 362 to 366 define a time period in the time axis 370 into periods. During each of the time periods an inductive power supply inductively transmits signal and receives a response as will be explained below. In an embodiment, the response may be received during the transmitting in each of the time periods, as can be seen from the timely alignment of items in the time periods.

Items 312 to 315 illustrate data signals used to modulate inductively received signals from an inductive power supply. Each of the data signals include data encoded into the data signal at the charged device as illustrated by items 316 to 319. Item 332 illustrates an envelope detected signal at the inductive power supply. Accordingly, the item 332 may illustrate the signal resulting from step 212 in FIG. 2, for example. Item 334 illustrates a data signal in the inductive power supply, for example, a waveform obtained as a result of the step 213 in FIG. 2.

Items 352 to 358 illustrate decoded data in the inductive power supply. The decoded data may be obtained by feeding the data signal 334 to a controller of the inductive power supply. The controller of the inductive power supply receives the data signal and interprets it, thus performs decoding of the received data signal. The result of the decoding may comprise one or more bits, symbols or messages that the controller can interpret. Accordingly, if the controller can interpret the decoded data, the decoded data can be used in decision making, e.g., in deciding whether to continue charging, whether a nearby device exists, or whether a charging of a device has been successful. However, if the decoded data includes errors, the decoding has failed and the data can not be used by the controller.

In the example of FIG. 3, the failure of decoding the data signal 334 is illustrated by the difference of the data contents 316 to 319 of modulating data signals 312 to 315 and decoded data 352 to 358.

In the following it is referred to both FIGS. 2 and 3. Describing now the scenario shown during time period 362. Accordingly, in step 204 the inductive power supply may generate a poll signal 302 with a voltage level of $V_{poll}$ that is fed to the transceiver of the inductive power supply so as to generate a varying magnetic field corresponding to the poll signal. When a device capable of being induced a current by a varying magnetic field is within the magnetic field generated by the inductive power supply a current corresponding to the poll signal generated in the inductive power supply is induced to the device. Accordingly, the device within the magnetic field generated by the inductive power supply effectively receives the poll signal. The received poll signal is modulated with a data signal 312 in the device. The data signal comprises a content 316 that in this example is illustrated with a letter 'A'. The modulated poll signal is inductively transmitted to the inductive power supply. Accordingly, the device may include the necessary means e.g. a coil, for inductively transmitting a signal.

The inductive power supply receives the modulated poll signal in 205 and determines whether the received charging signal comprises a modulation by processing the received poll signal in a similar manner as explained in steps 212 to 214 with a received charging signal. Accordingly, envelope detection and triggering may be performed to the received polling signal so as to determine, whether the received polling signal comprise a modulation.

The envelope detected poll signal obtained according to step 212 is illustrated in 332. In 213 amplitude changes in the envelope detected poll signal may be determined and a waveform as illustrated in item 334 may be obtained by triggering the envelope detected poll signal. Since the triggering results in a waveform as illustrated by a rectangular waveform in item 334, it may be determined that the poll signal received in 205 comprises a modulation. The waveform 334 obtained by triggering represents the data signal used to modulate the poll signal.

Thresholds to perform triggering according to 213 are illustrated in FIG. 3 by voltage levels $V_{th1}$ and $V_{th2}$ depicted with dashed lines. The dashed lines cross the envelope detected waveform 332 at triggering points that are shown as round dots in the crossings of the dashed lines and the envelope detected waveform. Accordingly, a threshold for determining an amplitude decrease in the envelope detected poll signal is illustrated by $V_{th1}$ and a threshold for determining an amplitude increase in the envelope detected poll signal is illustrated by $V_{th2}$ in FIG. 3.

According to 214, when one or more amplitude changes are determined in the envelope detected poll signal 332, a modulation has been detected in the inductively received poll signal in the inductive data supply.

The data waveform 334 obtained from step 213 may be decoded in a controller of the inductive power supply. Thereby, the data content of the waveform may be derived. As can be see in FIG. 3, the data content of the data signal modulating the poll signal is 'A' 312, whereas the modulated poll signal is decoded in the inductive power supply into 'X'. Thus, the decoding of the data has failed and the data is erroneously received in the inductive power supply.

However, according to an exemplary embodiment, the modulation determined in the received envelope-detected poll signal may be used to determine that a device exists within a magnetic field generated by the inductive power supply. Accordingly, the device is within a distance from the inductive power, at which distance the device can receive inductively transmitted signals from the inductive power supply. Thereby, decoding of the data signal 334 is not necessary to determine a presence of a device within the magnetic field or if to determine if a response was received to the inductively transmitted poll signal.

In the example of FIG. 3, after the inductive power supply has determined that a nearby device exists on the basis of the determined modulation in the received envelope detected signal 332, the inductive power supply may start charging according to 208 and generate a charging signal 304 with a voltage level of $V_{charge}$ for inductively charging the nearby device. As can be seen from the Figure, the $V_{charge}$ may be higher than $V_{poll}$ previously transmitted by the inductive power supply.

The envelope detected waveform 332 and data signal waveform 334 may be obtained in a similar manner for the charging signal during the time period 364 and status query signal during the time period 366 as explained above with the poll signal during time period 362.

Describing now the scenario shown during time period 364. During the charging, the steps 210 to 214 may be followed in the inductive power supply. During the charging the inductive power supply may expect to receive data from the charged device at least once in a predetermined time period T, as illustrated in the FIG. 3. The charged device may modulate the inductively received charging signal with a data signal 313, 314. The data signal may comprise a content 317, 318, such as a letter 'C', in the present example. The content in the successive data signals 313 and 314 may also be different. The inductively received charging signal is modulated in the charged device by the data signal 313, 314, and the modulated charging signal is transmitted inductively to the inductive power supply in a similar manner as performed with the poll signal above.

The decoding of the inductively received charging signal modulated by the data signal 313 is successful since the decoded data content 354 corresponds to the data content 317 in the modulating data signal 313. Accordingly, the inductive power supply may correctly interpret the data and determine that a charged device is still charging and the charging may be continued. However, according to an embodiment, decoding of the inductively received data signal is not necessary in the inductive power supply to determine whether to continue charging or not. This is because the inductively received charging signal may be processed as explained in steps 212 to 214. Thereby, the charging may be continued on the basis of the inductively received charging signal comprises a modulation.

As can be seen from the threshold amplitude levels $V_{th1}$ and $V_{th2}$ illustrated by dashed lines in FIG. 3, the envelope detected waveform 332 exceeds those thresholds. Consequently, the envelope detected waveform is triggered and a data signal waveform 334 may be obtained. Thereby, the determining of the modulation in the inductively received charging signal may be performed in a similar manner as explained above with poll signal and in steps 212 to 214 in FIG. 2.

However, the detection of the data signal waveform from the charging signal 304 when modulated with the data signal 314 is not successful since the decoded data content 356 from the modulated charging signal results in letter '7'. Accordingly, the obtained data content fails to correspond with the data content 318 of the modulating data signal. Thereby, decoding of the data has failed. Since the data is received erroneously the controller may not interpret the data correctly. In an exemplary embodiment, the charging may be continued since the inductive power supply may determine a modulation from an amplitude change in the received envelope detected charging signal in a similar manner as with the envelope detected poll signal as discussed above and explained in the process steps 212 to 214. Accordingly, since the inductive power supply may determine that the charged device is within the range of wireless transfer of power and the charging may continue although decoding of the data signal has failed.

After the charging signal 304 is modulated with data signal 314 by the charged device, no further modulating of the charging signal is performed in the exemplary scenario of FIG. 3. A predetermined time T elapses and the inductive power supply does not receive data from the charged device as can be seen from the waveform 332.

Since no data is received, the inductive power supply may determine that charging should be discontinued, thus stopped. Since no amplitude changes are determined in the inductive power supply it may be determined that the charged device has left the range of the magnetic field generated by the inductive power supply, thus the range of inductive transfer of signals.

Describing now the scenario shown during time period 366. Since the charged device may be within the range of inductive transfer of signals from the inductive power supply, the inductive power supply generates a status query signal 306 with a voltage level $V_{query}$ and feeds it to the transceiver so as to induce a current corresponding to the status query signal in the charged device according to step 215. As can be seen from the FIG. 3, the $V_{query}$ may be less than $V_{charge}$ of the charging signal previously transmitted by the inductive power supply. When the charged device is within the range of inductive transfer of signal, it receives the induced status query from the inductive power supply and modulates the received signal with a data signal 315 including a content 'OK' 319 that indicates that the charging has been completed successfully. The charged device inductively transfers the modulated status to the inductive power supply that performs determining whether a modulation exists in the inductively received status query signal, in a similar manner as explained with the poll signal and charging signal and steps 212 to 214. Consequently, although decoding of the data signal 334 fails as can be seen from the difference of items 358 and 319, the inductive power supply may determine on the basis of the determined modulation of the received signal that a response has been received. In this way, the inductive power supply may determine that the charged device is still within a range of inductive transfer of signals from the inductive power supply. In an embodiment illustrated in FIG. 3, an inductive power supply may determine that a response to a poll signal 302 comprises a modulation. On the basis of the response comprising a modulation, it may be determined that a device is within a range of inductive transfer of signals from the inductive power supply. Accordingly, charging may be started and a charging signal 304 may be transmitted. As can be seen from FIG. 3, the charging signal may have a higher power than the poll signal 302 since $V_{charge}$ is higher than $V_{poll}$. The charging may be stopped when a modulation is not determined in one or more received signals in the inductive power supply. Then a status query signal 306 may be transmitted from the inductive power supply. The transmitted status query signal may have a lower power than the charging signal 304 since $V_{charge}$ is higher than $V_{query}$. Accordingly, the power of the transmitted signal may be adjusted on the basis of whether a modulation has been determined in a response to an inductively transmitted signal. In this way power of the generated signal may be adjusted without decoding the received signals and also when decoding fails due to corrupted data signals.

It should be appreciated that the adjusting of the power of the inductively transmitted signals may comprise adjusting a pulse width of a signal fed to a transceiver to be inductively transmitted. Accordingly, in the example of FIG. 3, the charging signal would have the largest pulse width and the pulse widths of the poll signal and status query signal would be smaller than that of the charging signal. In this the energy consumption of the inductive power supply may be high only during charging.

It should be appreciated that the adjusting of the power of the inductively transmitted signals may comprise adjusting a frequency of a signal fed to a transceiver to be inductively transmitted. Accordingly, the generated charging signal would have a frequency near of at the operational frequency of a transceiver so as to have the optimum gain for the charging signal. The frequencies of the poll signal and status query signal would be removed from the operational frequencies partly or totally so as to transmit them with a lower power than the charging signal. In this way implementation of the inductive power supply may be kept simple as the amplitude is not affected.

It should be appreciated that the different ways to adjust transmission power described above may also be used in combination with each other.

It will be obvious to a person skilled in the art that, as the technology advances, the inventive concept can be implemented in various ways. The invention and its embodiments are not limited to the examples described above but may vary within the scope of the claims.

We claim:

1. A method comprising:
    transmitting inductively, by an inductive power supply to at least one device, a poll signal;
    receiving inductively, by the inductive power supply, a signal received from the at least one device in response to the poll signal;
    determining whether the inductively received signal comprises a modulated data signal; and
    adjusting a power of a transmission signal produced by the inductive power supply on the basis of the modulated data signal,
    wherein the inductive power supply transmits inductively, on the basis of the modulated data signal, a transmission signal with a power higher, lower, or a combination thereof than the poll signal.

2. The method of claim 1 further comprising:
    decoding the modulation of the modulated data signal;
    identifying a device generating the modulated data signal on the basis of a result of the decoding; and
    determining a signal power to be used in inductive transmissions on the basis of the identified originating device.

3. The method of claim 1, further comprising determining that a device exists within a range of an inductive transfer if a modulation is determined in a predetermined period.

4. The method of claim 1, further comprising the device determining a modulation for the modulated data signal on the basis of a change in amplitude of the transmission signal received exceeding a threshold.

5. The method of claim 4, wherein the threshold comprises a triggering threshold to determine values of data corresponding to a modulation.

6. An apparatus comprising:
a transmitter configured to transmit inductively a poll signal;
a receiver configured to inductively receive a modulated data signal in response to the poll signal;
a controller configured to determine whether a received signal comprises a modulation; and
a controller configured to adjust a power of the transmitted signal on the basis of a modulation of the received signal,
wherein the transmitter is configured to inductively transmit a third signal, on the basis of the received signal comprising a modulation, wherein the third signal has a power higher than the poll signal.

7. The apparatus of claim 6, further comprising a controller configured to adjust a frequency, an amplitude, or a pulse width of the transmitted signal.

8. The apparatus of claim 6, further comprising a transmitter configured to continue the transmitting of the transmitted signal on the basis of the received signal comprising a modulation.

9. The apparatus of claim 6, comprising a transmitter configured to inductively transmit a third signal with a lower power than the poll signal, when the received signal does not comprise a modulation.

10. The apparatus of claim 6, comprising a controller configured to determine that a device exists within a range of an inductive transfer if a modulation is determined in a predetermined period.

11. The apparatus of claim 6, comprising a controller configured to determine a modulation on the basis of a change in amplitude of the transmission signal received exceeding a threshold.

* * * * *